United States Patent
Gaita et al.

(10) Patent No.: US 6,451,723 B1
(45) Date of Patent: Sep. 17, 2002

(54) POLYMER-BOUND NITROGEN ADSORBENT AND METHOD OF MAKING AND USING IT

(75) Inventors: Romulus Gaita, Morton Grove; Stephen Frederic Yates, Arlington Heights; Shaojun James Zhou; Chin-Hsiung Chang, both of Palatine, all of IL (US)

(73) Assignee: Honeywell International Inc., Morristown, NJ (US)

( * ) Notice: Subject to any disclaimer, the term of this patent is extended or adjusted under 35 U.S.C. 154(b) by 2 days.

(21) Appl. No.: 09/611,432

(22) Filed: Jul. 7, 2000

(51) Int. Cl.[7] .............. B01J 20/18; B01J 20/30
(52) U.S. Cl. .............. 502/62; 95/130; 96/135; 96/136; 96/147; 96/153; 96/154; 502/64; 502/233; 502/401; 502/407; 502/415
(58) Field of Search .............. 96/135, 136, 139, 96/147, 152–154, 121, 137; 95/128–130; 502/60, 63, 64, 67, 69, 62, 232, 233, 401, 402, 407, 412–415, 79

(56) References Cited

U.S. PATENT DOCUMENTS

| | | | |
|---|---|---|---|
| 4,048,111 A | * 9/1977 | Rosback et al. | 502/64 |
| 4,248,737 A | * 2/1981 | Kulprathipanja | 502/62 |
| 4,295,994 A | * 10/1981 | Kulprathipanja | 502/62 |
| 4,316,819 A | * 2/1982 | Tu et al. | 502/62 |
| 4,406,819 A | 9/1983 | Kulprathipanja et al. | 502/79 |
| 4,481,018 A | 11/1984 | Coe et al. | 502/85 X |
| 4,544,378 A | 10/1985 | Coe et al. | 502/85 X |
| 4,687,573 A | 8/1987 | Miller et al. | 55/524 X |
| 4,822,492 A | 4/1989 | Chao et al. | 210/679 |
| 5,152,813 A | 10/1992 | Coe et al. | 95/103 |
| 5,258,060 A | 11/1993 | Gaffney et al. | 95/101 |
| 5,266,102 A | 11/1993 | Gaffney et al. | 95/103 |
| 5,354,360 A | 10/1994 | Coe et al. | 95/101 |
| 5,413,625 A | 5/1995 | Chao et al. | 95/103 |
| 5,672,195 A | 9/1997 | Moreau et al. | 95/96 |
| 5,997,829 A | 12/1999 | Sekine et al. | 502/300 X |
| 6,030,916 A | 2/2000 | Choudary et al. | 502/65 |

FOREIGN PATENT DOCUMENTS

| | | |
|---|---|---|
| GB | 1045694 | 10/1966 |
| WO | WO 99/49964 | 10/1999 |

OTHER PUBLICATIONS

Patent Abstracts of Japan; Molded Article Comprising Polymeric Adsorbent; Publication No.: 11 147983; Publication Date: Jun. 2, 1999; vol. 1999; No. 11.

* cited by examiner

*Primary Examiner*—Richard L. Chiesa
(74) *Attorney, Agent, or Firm*—William J. Zak, Jr., Esq.

(57) ABSTRACT

A gas adsorbent is made by dissolving a polymer in one or more first solvents to form a polymer solution; mixing an inorganic adsorbent with the polymer solution to form a precursor; molding the precursor; and leaching the first solvents from the precursor with a second solvent.

29 Claims, 4 Drawing Sheets

POLYMER-BOUND NITROGEN ADSORBENT AND METHOD OF MAKING AND USING IT

BACKGROUND OF THE INVENTION

The present invention generally relates to gas adsorption and, more particularly, to an apparatus and method of selectively adsorbing nitrogen over oxygen from a gas mixture.

The separation of gases, including nitrogen from oxygen, can be useful in a wide variety of environments. As an example, separating nitrogen from air for use in a cockpit of an aircraft continues to be problematic. Of course, an inefficient means of oxygen supply can impact the performance of the pilot. It can also translate to higher maintenance costs for the separation system. Many attempts to design gas separation systems have been made.

For example, a process for separating mixtures of oxygen and nitrogen by the use of an adsorbent is shown in U.S. Pat. No. 5,672,195. Therein, it is explained that zeolites have been used selectively to separate nitrogen from oxygen based on the strong interactions between the quadrupole moment of the nitrogen molecule and the cations of the zeolite. It was further noted that varying the temperature and pressure has also been used to optimize the nitrogen adsorption and desorption efficiency. The invention employed zeolites that were agglomerated preferably with an inorganic binder and formed into spheres. The porosity of the adsorbent was optimized to accelerate the adsorption kinetics. Some drawbacks to this design include loss of capacity due to dilution by the binder and, particularly, the generation of dust particles due to attrition of the binder and movement of adsorbent particles.

In U.S. Pat. No. 4,687,573, a sorbing apparatus for removing one or more components from a gas or liquid fluid is disclosed. The sorbing apparatus includes a chamber having a bed of sorbent particles bound together by a polymeric binding agent and/or bound to the chamber to prevent movement of the particles relative to one another. The chamber includes ports to allow an inflow and outflow of a fluid having the components to be removed, as well as a fluid used to purge the components. The process of making the bed of sorbent particles includes preheating inorganic sorbent particles and mixing the heated particles with a powdered polymeric binding agent. The mixture of particles and binding agent is placed under pressure at a solid-liquid transition temperature and then cooled. Optionally, the mixing and application of pressure may be done in a mold to provide a desired shape. Some disadvantages, however, to the above include the fact that the process is difficult to control.

Latex polymer bonded crystalline molecular sieves in an aqueous medium are shown in U.S. Pat. No. 4,822,492. It is pointed out therein that zeolites bonded to inorganic oxides deteriorate in aqueous media. However, the use of organic polymer binders in lieu of inorganic polymer binders has alleviated such problems. Yet, the use of an organic solvent at a high level has decreased the adsorptive capacity. Thus, the invention used latex in place of the organic polymer binder. The latex was generally a suspension of polymer particles in water. A crystalline inorganic compound, such as a zeolite, is mixed into the latex. An optional inorganic oxide binder was used. The resulting mixture was dried to remove water and then ground. Disadvantages with this disclosure include dust formation.

Currently Honeywell Normalair-Garrett Limited of England markets a generic Onboard Oxygen Generation System (OBOGS) based on the selective adsorption of nitrogen from air. This system consists of a pressure swing adsorption unit in which air is fed into the first of three cartridges at an elevated pressure. The first cartridge contains an inorganic adsorbent that is selective for nitrogen over oxygen. The adsorbent can be clay bound activated zeolite 13X (HP-13X). The nitrogen is thereby removed from the air, providing oxygen-enriched air for use in an aircraft. Periodically, the cartridge in use as a nitrogen adsorbent is changed, the pressure on the first cartridge is reduced, thereby allowing the adsorbed nitrogen to be desorbed. However, the capacity of the adsorbent mass within the cartridge is highly variable and the performance of each cartridge also varies.

As can be seen, there is a need for an improved apparatus for and method of separating nitrogen from air. Also needed is an apparatus and method that has a high capacity and reliability for nitrogen adsorption. A further need is for a method of making a nitrogen adsorbent that is simple and low in cost. A nitrogen adsorbent apparatus is also needed and that can be utilized in the form of a cartridge that allows easy use and replacement, while minimizing shifting of the adsorbent material within the cartridge due to vibration or other shocks. The cartridge should also provide good mass transfer kinetics and withstand heating up to about 200° C.

SUMMARY OF THE INVENTION

In one aspect of the present invention, a method of making a gas adsorbent comprises dissolving a polymer in at least one first solvent to form a polymer solution; mixing an inorganic adsorbent with the polymer solution to form a precursor; molding the precursor; and leaching the at least one first solvent from the precursor.

In another aspect of the present invention, a gas adsorbent system comprises a housing; and a molded gas adsorbent within and substantially completely filling the housing such that the gas adsorbent is prevented from shifting within the housing in the absence of a component that adheres the gas adsorbent to the housing, with the gas adsorbent having been formed from a polymer solution and an inorganic adsorbent.

These and other features, aspects and advantages of the present invention will become better understood with reference to the following drawings, description and claims.

DETAILED DESCRIPTION OF THE INVENTION

Although the present invention can be particularly useful in the context of an onboard oxygen generation system of an aircraft, the present invention is not so limited. The apparatus and method of the present invention may be generally practiced in the chemical or gas processing contexts.

Figure 1:
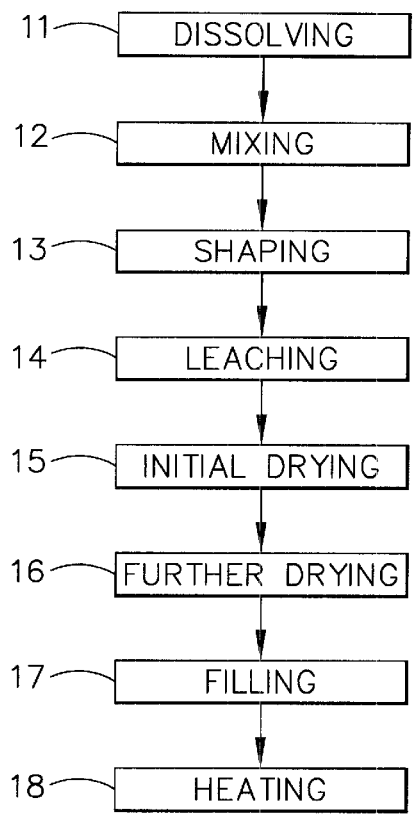
FIG. 1 is a flow chart depicting one embodiment of a method of making a gas adsorbent according to the present invention.

In describing a method of making a gas adsorbent in accordance with one embodiment of the present invention, FIG. 1 depicts the acts or steps of such method. A polymer solution is formed by a dissolving step 11 in which a polymer is dissolved in one or more first solvents. The polymer is selected based on its good mechanical strength at operating temperatures between 25° C. and 200° C., combined with a softening temperature higher than the latter temperature but below the decomposition temperature of the inorganic adsorbent described below. The reference to "softening temperature" is intended to refer to the temperature at which the polymer will yield or flow in response to an applied force, while "decomposition temperature is intended to refer to the temperature at which irreversible chemical changes occur in the polymer. The polymer must also wet the inorganic adsorbent and show good adhesion to the adsorbent. Thus, the specific polymer used can vary. Examples of useful polymers include polysulfone, polyamide, polyimide, epoxy, polyolefin, polyether, polysiloxane, polyvinyl and polyketone. Preferably, polysulfone is the polymer as a result of its good mechanical strength over the required temperature range. Optionally, the polymer is combined with a crosslinking or hardening agent that is activated on heating, while in other cases, no such crosslinking agent is necessary. Where used, the crosslinking agent must be chosen with the choice of polymer in mind, since it is well known to those skilled in the art that certain crosslinkers are used with certain polymers. Thus, for example, various polyfunctional organic amines are frequently used to crosslink epoxy polymers, and diols or polyols are used to crosslink polymeric siloxanes.

The first solvent(s) is chosen on its ability to dissolve the selected polymer at near room temperature to the desired final concentration. It must also be fully miscible with a second solvent described below, and be easy to handle. It will be understood by those skilled in the art that different polymers are soluble in different solvents, so that the choice of solvent is necessarily dependent on the choice of polymer. For the above polymers, the first solvent(s) can include N,N-dimethylformamide (DMF); dimethyl sulfoxide (DMSO); acetone; 1,4-dioxane; methyl cellosolve; pyridine and mixtures thereof, as examples. N,N-dimethylformamide is preferred because of the high solubility of polysulfone in this solvent, and its lack of undesirable health, safety or environmental characteristics. While the ratio of polymer to first solvent(s) can likewise vary, a preferred ratio is between about 1:5 and 1:10 by weight and, more preferably about 1:5.5 by weight. Above about 1:5, the polymer may not be entirely dissolved, or may have a very high viscosity, while below about 1:10, the viscosity of the precursor paste described below and generated after addition of the inorganic adsorbent will be too low, causing handling problems.

Thereafter, a mixing step 12 includes mixing an inorganic adsorbent into the polymer solution to form a precursor. The inorganic adsorbent is chosen based on its ability to adsorb a selected element, such as nitrogen, from a gas mixture. In the case of adsorbing nitrogen, the inorganic adsorbent can include zeolite, activated alumina, silica gel, carbon molecular sieves and mixtures thereof. While various zeolites can be useful, activated zeolite 13X is preferred due to its capability for selectively adsorbing nitrogen from air. The term "activated zeolite 13X" generally refers to an activated form of 13X (HP-13X, 13-HP) and which is described in UOP Material Safety Data Sheet dated February 1997, published by UOP Inc. and which is incorporated herein by reference. As an example, activated zeolite 13X is manufactured by UOP Inc. under the tradename OXYSIV™ 5 (Oxy-5).

The polymer is mixed with the inorganic adsorbent in a ratio that is high enough (after the first solvent is removed as described below) to provide good mechanical strength but no more than enough for such strength since the inorganic adsorbent is the active ingredient. Thus, the ratio of polymer to inorganic adsorbent is preferably between about 40:60 and 5:95 by weight. Above about 40:60, the final concentration of polymer in the product will be too high, resulting in a reduction in gravimetric capacity, and poorer mass transfer kinetics, while below about 5:95 the final product will be too weak mechanically. More preferably, the ratio is about 10 to 90 by weight.

From the mixing step 12, a precursor is formed having the consistency of a paste or dough. Such consistency is the result of good mixing and the wetting of the inorganic adsorbent by the polymer and the first solvent. The viscosity of this dough can be adjusted by varying the amount of the first solvent used in the dissolution step 11 described above. The optimal viscosity will depend on the choice of shaping method below.

With the precursor in the consistency of a paste or dough, the precursor can then undergo a shaping step 13. The shaping step 13 can include molding the precursor into various shapes in order to compactly fit the produced gas adsorbent into a housing cartridge described below. The molded precursor can be of various shapes, such as droplets, extrudates, discs, spiral wound modules, and hollow fibers.

The droplets can be formed by dripping the precursor into a stirred vessel containing one or more second solvents described below. As each droplet hits the surface of the second solvent(s), it forms a surface skin sufficient to prevent it coalescing with neighboring droplets. The suspension of droplets is kept at room temperature with occasional stirring until the droplets are hard.

To form the extrudates, the precursor is extruded through a circular die and into a vessel containing one or more second solvents described below. This generates long strings of polymer/adsorbent, which after hardening can be chopped into a convenient size.

For the disc shapes, the precursor is spread thinly on a mesh support. The mesh support may be of any suitable material that can tolerate temperatures up to about 200° C. The resulting sheets are then immersed in one or more second solvents described below to harden the sheets. After hardening, the sheets are cut into disks that may also contain holes to regulate the flow rate through the disks. The holes can be formed by imperfect coating of the precursor on the mesh support or by piercing the coating after it has dried.

The spiral wound modules are made by the precursor being spread thinly on a mesh support to form sheets as above. However, instead of cutting the sheets into disks, the sheets are rolled around a porous metal hollow rod to form a cylinder. A spacer made of any porous material that tolerates the temperatures in the process (e.g., metals or plastics) may optionally be rolled up with the sheet to improve mass transfer. The ends of the cylinder are sealed with a suitable material such as epoxy to ensure that at one end of the cylinder, the flow can only pass through the central rod, while at the other end, the flow can only come from the sides of the rolled cylinder. Optionally, as above, the modules can be formed with holes.

With the hollow fibers, the precursor is extruded through a die to generate hollow fibers or tubes. The fibers should be extruded into one or more second solvents described below to harden the fibers from the outside, as well as flow the second solvent(s) into the center of the fibers to harden them from the inside. Once hardened, the fibers are cut to a desired length and bundled. The ends of the fibers are sealed so that at one end the flow is to the interiors of the fibers, while at the other ends, the flow is from the space between the fibers.

After the shaping step 13, the shaped precursor undergoes a leaching step 14. In such step 14, the first solvent(s) is dissolved or leached from the shaped precursor by one or more second solvents. The act of leaching generates porosity in the shaped precursor preferably on the order of about 0.01 to 20 microns and, more preferably, about 10 microns. The resulting porosity in the shaped precursor enhances the mass transfer of air to the gas adsorbent sites. Although the second solvent(s) readily dissolves the first solvent(s), the second solvent(s) is a non-solvent to the polymer. It is also desirable that the second solvent(s) be somewhat volatile, non-toxic, and non-viscous. Accordingly, the second solvent(s) can include ethanol, methanol, water, and mixtures thereof, as examples.

Following the leaching of the first solvent(s), an initial drying step 15 includes drying the shaped precursor in air at room temperature. The extent of drying is such that the shaped precursor is non-tacky and easy to handle. Next, the dried, shaped precursor undergoes a further drying step 16 wherein the precursor is heated at a temperature (and optionally under vacuum) in order to substantially remove the second solvent by evaporation. What is meant by "substantially remove" is that the remaining content of volatile material is less than about 25% by weight Next, the dried and shaped precursor (or gas adsorbent) can be placed into a housing or cartridge in a filling step 17. By such filling step 17, the gas adsorbent substantially completely fills the housing whereby the gas adsorbent is prevented from shifting within the housing in the absence of a component that adheres the gas adsorbent to the housing. The term substantially completely fills" means and refers to essentially filling the entirety of the housing such that the total void space between the gas adsorbents themselves as well as between the gas adsorbents and the housing is about 10 to 30%. Optionally, the gas adsorbent may be loaded into the housing under pressure to ensure maximum loading of the adsorbent in the housing. Where the adsorbent has been shaped into droplets or chopped extrudates, it is important that the packed density of the adsorbent be between 0.50 and 0.65 g/mL in order to ensure that, after step 18, there is effective adhesion between the droplets or extrudates.

After the filling step 17, the housing filled with the shaped precursor undergoes a heating step 18 near or above the softening temperature of the polymer in an inert gas to ensure immobilization of the gas adsorbent in the cartridge such that the gas adsorbent substantially completely fills the housing. The adsorbent is accordingly prevented from shifting within the housing in the absence of a component that adheres the gas adsorbent to the housing. The heating step 18 also creates a maximum degree of porosity, namely, about 30 to 40%. The porosity is needed to enable a flow of gas to pass through the gas adsorbent.

For the heating step 18 in inert gas, it is preferred to use hot inert gas. External heating of the loaded cartridge or module is not as effective. A temperature gradient from the module wall to the middle of the module tends to cause uneven treatment of all adsorbent or extrudate material. It is important to create porosity with the passing of the hot gas when the precursor is softened and the extrudates are immobilized. On the other hand, the softening of the precursor may plug the entrance to the micropores of the inorganic adsorbent. Therefore, during the heat treatment 18, diffusion of gaseous molecules in and out of the micropores is important to establishing and maintaining microporosity of the final shaped adsorbent.

The different shapes of precursors mentioned above lend themselves to different methods of filling the gas adsorbent in the housing or cartridge. For example, in the case of precursor droplets, and after the leaching step 14, the droplets can be placed in the housing and then formed into a single mass. This can be accomplished by (1) adding a binder, such as epoxy, to the droplets, (2) heating the mass under pressure to a temperature near or above the softening temperature of the polymer, or (3) adding again the first solvent to make the droplets sticky and then evaporating the first solvent. With the hollow fibers, the hardened fibers can be bundled and packed in the cartridge. Once bundled and packed, the fibers can be sealed as described above.

Figure 2:
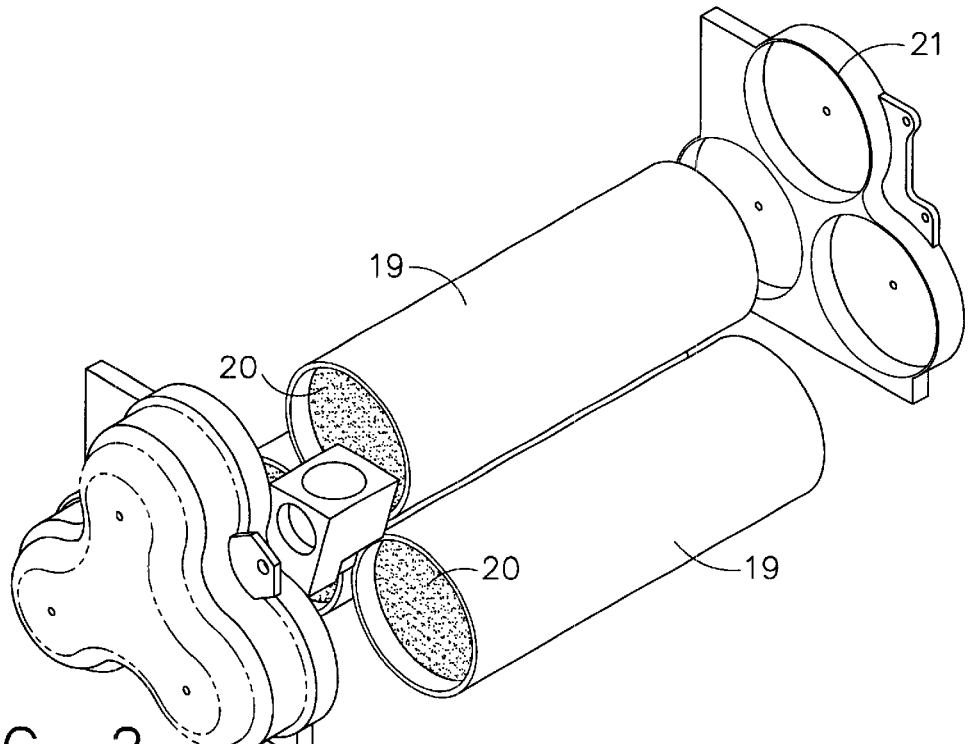
FIG. 2 is a perspective view of an embodiment of a gas adsorbent system according to the present invention.

FIG. 2 schematically depicts a gas adsorbent system comprising one or more housings 19 filled with a gas adsorbent 20 that is characterized by a polymeric membrane on a surface of an inorganic adsorbent. In this embodiment, the gas adsorbent is in the shape of extrudates. The system may also include valves 21 on either sides of the housings 19 to enable a flow of gas into and out of the housings 19.

EXAMPLE 1

493.75 grams of UOP, Inc. 13X zeolite powder were mixed with 400.8 gram of a N,N-dimethylformamide (DMF) solution containing 15.4 wt. % of polysulfone. To this mixture, 230 grams of DMF were added to make a precursor dough in an automatic mixer. The dough was extruded through an air-driven extruder into a 5-gallon bucket of de-ionized water.

The extruded material was kept in water for 3 hours and removed for air drying at 25° C. After 3½ hours, 1108.1 grams of material were obtained. The extruded material was then heated at 120° C. in a vacuum oven (70 torr) for 16 hours. A final weight of 566.75 grams was obtained.

EXAMPLES 2–4

Following the general procedure of Example 1, various amounts of mixtures were used to prepare extruded materials with UOP 13X, polysulfone, and DMF. Table 1 summarizes results of Examples 1–4.

TABLE 1

|  | Example 1 | Example 2 | Example 3 | Example 4 |
|---|---|---|---|---|
| 13X zeolite, grams | 493.75 | 519.01 | 530.34 | 493.82 |
| 15.4% polysulfone in DMF, grams | 400.8 | 400.2 | 400.8 | 401.1 |
| DMF, grams | 230.0 | 215.1 | 220.0 | 232.0 |
| 13X in the final extrudate, wt. % | 88.9 | 89.4 | 89.6 | 88.9 |
| Expected $N_2$ capacity at 800 torr, mmole/g | 0.391 | 0.393 | 0.394 | 0.391 |
| Extrudate after air dry, grams | 1036.7 | 940.1 | 1006.6 | 1032.05 |
| Extrudate after vacuum drying, grams | 566.75 | 598.05 | 598.25 | 623.00 |
| Weight loss during static capacity measurement, % | 18.92 | 19.85 | 19.40 | 22.05 |
| Static $N_2$ capacity at 800 | 0.37 | 0.34 | 0.38 | 0.37 |

TABLE 1-continued

| | Example 1 | Example 2 | Example 3 | Example 4 |
|---|---|---|---|---|
| torr, mmole/g | | | | |

The static performance of the polymer bound extrudates prepared as illustrated in Examples 1–4 was evaluated by measuring the adsorption capacity of the adsorbent material for nitrogen with a Micromeritics ASAP2000 instrument (Micromeritics Instrument Corporation, Norcross, Ga.). An extrudate sample of 0.4 grams was heated at 210° C. under vacuum (4 micrometer Hg) for about 40 hours. During the heat treatment, chemical species adsorbed by the adsorbent were desorbed from the adsorbent material. The sample was then exposed to a controlled addition of nitrogen at 25° C. Nitrogen gas pressure was monitored until a constant pressure was measured. The difference between the amount of nitrogen introduced and the gas remaining in the gas phase determined the capacity of the adsorbent at the gas pressure. A series of loading capacities for different gas pressures at a constant temperature of 25° C. thus represented the static nitrogen isotherm on the polymer-bound adsorbent. The same isotherm was also obtained for the 13X zeolite used for the adsorbent preparation.

Figure 3:
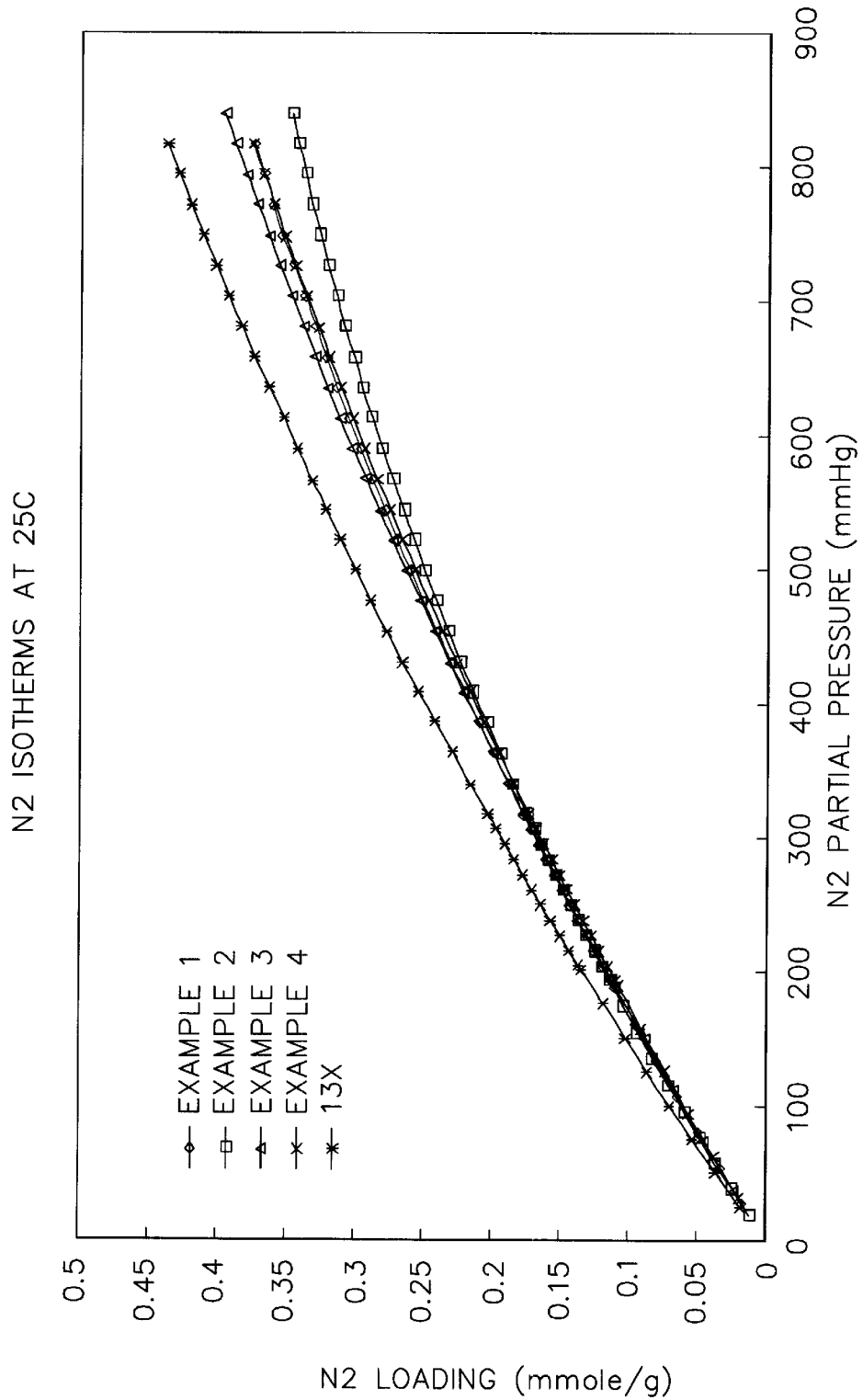
FIG. 3 is a graph of nitrogen gas loading versus nitrogen gas partial pressure for gas adsorbents made according to an embodiment of the present invention.

Results of the static isotherm measurement are illustrated in FIG. 3. The $N_2$ capacity value at 800 mmHg is listed in Table 1 along with the percent weight loss measured during the vacuum heat-treatment. With a $N_2$ capacity of 0.44 mmole/g for 13X zeolite powder and by knowing the composition of the extrudate, one can calculate the expected $N_2$ capacity for the extrudate by multiplying 0.44 mmole/g by the weight percent of 13X in the bound adsorbent. Except for the adsorbent material in Example 2, measured capacities are in good agreement with those calculated.

EXAMPLE 5

Following the general procedure of Example 1, 127.95 grams of UOP 13X zeolite were mixed with 106.5 grams of a DMF solution containing 15.4% of polysulfone. 39.15 grams of DMF were added to the mixture to make a precursor dough. The dough was extruded into a second solvent of methanol (500 grams). After 25 minutes, the first methanol was discarded and another 500 grams of methanol were added. After additional 60 minutes, the methanol was decanted. Extrudates recovered from the methanol solution were heated at 100° C. under vacuum for 15 hours.

35.16 grams of the dry extrudate were pressed into a stainless steel tube with a 2.8-cm diameter and a length of 10.2 cm. The packed tube was inserted into a hot-gas treatment apparatus. A stream of dry nitrogen was pre-heated by a gas heater to 230° C. and introduced to the packed tube at a flow rate of 3.0 liters/min. The packed tube was also heated at 210° C. by a heating tape. The exit gas temperature, the inlet gas temperature, and the heating tape temperature were continuously monitored. After about one hour, heating was stopped and the immobilized adsorbent was cooled down in the flow of nitrogen. The final weight was measured to be 30.49 gram.

The immobilized adsorbent with the stainless steel tube was removed from the hot-gas treatment apparatus and inserted into a dynamic test unit (described below for Example 6) for evaluation.

EXAMPLES 6–9

Extrudate materials prepared with the general procedure of Example 1 were packed and hot-gas treated as described in Example 5. This immobilized module was inserted into a dynamic test unit for evaluation. This test unit has a cross section area of 6.16 $cm^2$ and a total volume of 62.56 $cm^3$. The unit was first tested with a similar module packed with glass beads of 3 mm diameter (86.08 grams). A washout test was conducted to measure the total system void space at a nitrogen flow rate of 2450 $cm^3$/min. Subsequently, a module packed with the clay-bound beads of 13X (Oxy-5) was tested for comparison with modules prepared with the present method.

The washout test was conducted by first heating the test tube with a heating tape to 210° C. in a constant flow of dry nitrogen for a period of 8 hours. After cooling, the weight of the total test module and the net weight of the adsorbent material were determined. A constant flow of pure oxygen at 25° C. was introduced into the test cell while the effluent gas was continuously monitored by an oxygen sensor. At a constant effluent concentration of 100% oxygen, the inlet gas was switched electronically to pure nitrogen. Effluent gas concentrations were recorded by a desktop computer. The total amount of nitrogen integrated until the complete breakthrough of nitrogen in the effluent represented the amount of nitrogen required to fill the total void of the test unit and the amount that was adsorbed in the adsorbent under the dynamic condition. By subtracting the void volume obtained by the glass bead measurement, the dynamic capacity of the adsorbent material can be calculated.

Results of testing on several materials prepared in Examples 5 . 9 are summarized in Table 2. These results show that by applying the present invention, substantial improvement in the dynamic capacity for $N_2$ on the per weight basis can be achieved. Similar volumetric efficiencies can be obtained at a lower pressure drop. The 13X zeolite is bound and immobilized with an organic binder that resists dissolution in water. Therefore, the bound adsorbent is stable to the attrition and water attack.

While the examples used here are for the development of an oxygen generating adsorbent, the process can be for any adsorbents that require low pressure drop and high resistance to attrition and water damage.

TABLE 2

| | Oxy-5 | Ex. 5 | Ex. 6 | Ex. 7 | Ex. 8 | Ex. 9 |
|---|---|---|---|---|---|---|
| 13X, grams | | 127.9 | 127.9 | 63.97 | 127.95 | 3086 |
| 15.4% polysulfone in DMF, grams | | 106.5 | 106.5 | 53.25 | 106.50 | 2571 |
| DMF, grams | | 39.2 | 39.2 | 19.57 | 42.30 | 1056 |
| Second solvent | | MeOH | MeOH | $H_2O$ | $H_2O$ | $H_2O$ |
| 13X in the final extrudate, wt. % | | 88.6 | 88.6 | 88.6 | 88.6 | 88.6 |
| Extrudate, mm | | 1.2 | 1.2 | 1.2 | 1.2 | 1.2 |
| Hot gas temperature, ° C. | | 210 | 200 | 200 | 200 | 210 |
| Hot gas flow rate, liter/min | | 3.0 | 3.5 | 3.5 | 3.5 | 3.7 |
| Hot gas pressure, psi | | 4.6 | | | | |
| Hot gas treatment time, min. | | 57 | 57 | 42 | 50 | 50 |
| Weight loss during hot-gas treat- | | 13.3 | 10.4 | | | 26.0 |

TABLE 2-continued

|  | Oxy-5 | Ex. 5 | Ex. 6 | Ex. 7 | Ex. 8 | Ex. 9 |
|---|---|---|---|---|---|---|
| ment, % | | | | | | |
| Final packing density, g/cm$^3$ | 0.628 | 0.487 | 0.507 | 0.477 | 0.458 | 0.509 |
| N$_2$ capacity, mmole/g | 0.237 | 0.250 | 0.231 | 0.257 | 0.303 | 0.306 |
| N$_2$ capacity, mmole/cm$^3$ | 0.149 | 0.122 | 0.117 | 0.123 | 0.139 | 0.156 |
| Pressure drop, psi | 0.34 | 0.82 | 0.26 | 0.20 | 0.14 | 0.36 |

Figure 4:
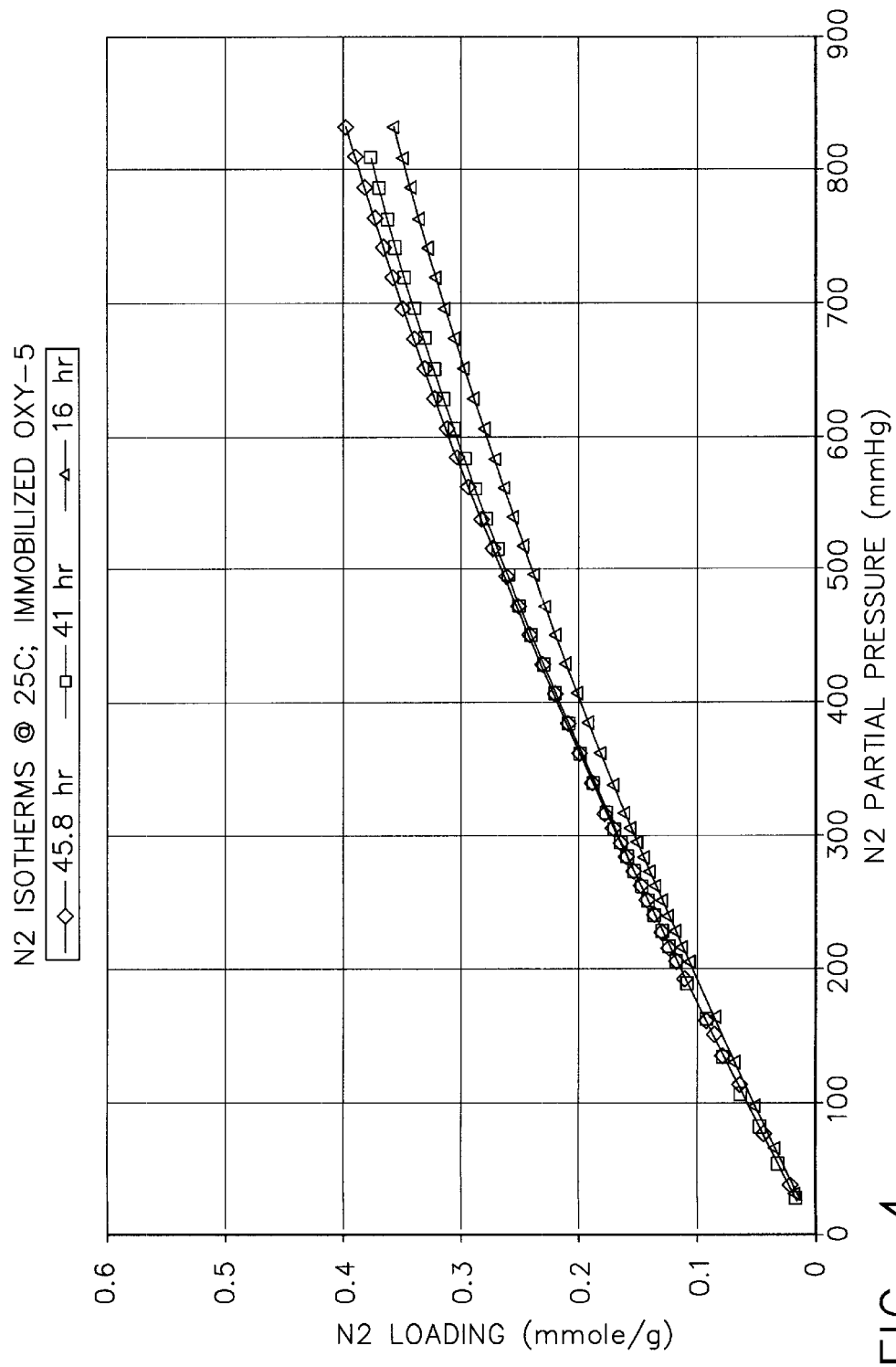
FIG. 4 is a graph of nitrogen gas loading versus nitrogen gas partial pressure for gas adsorbents made according to an embodiment of the present invention with varying heat treatment periods.

Extrudate materials were prepared following the general procedure of Example 1. The polymer-bound material was heated and tested for its equilibrium nitrogen capacity in the ASAP2000 instrument following the general procedure of Example 5. After 16.0, 41.0 and 45.8 hours, nitrogen isotherms were taken as shown in FIG. 4 and Table 3.

TABLE 3

| Extrudate | Example 10 | | |
|---|---|---|---|
| Heat treatment temp. (° C.) | 210 | 210 | 210 |
| Total treatment time (hr) | 16.0 | 41.0 | 45.8 |
| Weight loss (%) | 17.96 | 18.92 | 19.40 |
| N$_2$ capacity @ 800 mm Hg (mmole/g) | 0.345 | 0.375 | 0.380 |

These data show that at 210° C. the polymer-bound extrudate requires a minimum of about 40 hours to be fully activated for the adsorption of nitrogen. Extrudates prepared in this example were packed in a full size module for the enrichment of oxygen in air. The module had a cross section area of 88.25 cm$^2$, a length of 11.5 cm and a volume of 1015 cm$^3$. 710 grams of the extrudate were packed into the adsorbent module under pressure in five portions. Two metal filters were placed on both ends of the module.

FIG. 4 shows the effect of heat-treatment at 210° C. on N$_2$ isotherms for polymer-bound extrudate prepared according to Example 1. The packed module was installed into a hot-gas treatment apparatus similar to that used in Example 5. A stream of dry nitrogen was pre-heated by a gas heater to 235° C. and introduced to the packed module at a flow of 56.6 liters/min. The packed module was also heated externally by two heating tapes. The inlet gas temperature, exit gas temperature, heating tape temperatures, gas flow rate and pressure were continuously monitored. After a hot gas treatment duration, the module was cooled down to room temperature. The weight of the extrudate was measured. A dynamic washout test was conducted following the general procedure of Examples 6–9. A washout time was also measured from the introduction of nitrogen to the time that the effluent nitrogen reached 63%.

Figure 5:
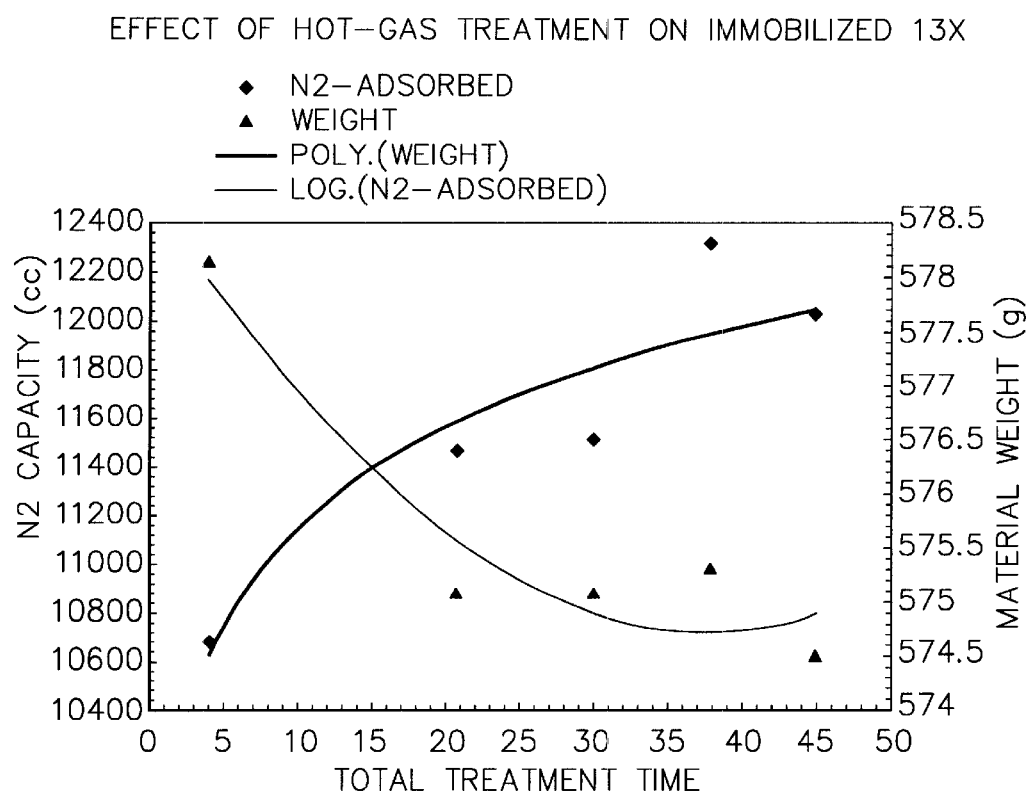
FIG. 5 is a graph of nitrogen capacity versus treatment time for a gas adsorbent according to an embodiment of the present invention.

Results of the hot-gas treatment are summarized in Table 4 and FIG. 5. As shown in FIG. 5, data are somewhat scattered. However, the trends are that the activation of the immobilized module also requires more than 40 hours.

TABLE 4

| Sample | Immobilized module (Example 10) | | | | |
|---|---|---|---|---|---|
| Exit gas temp. (° C.) | 175 | 172 | 176 | 182 | 177 |
| Treatment duration (hr) | 4 | 16.5 | 9.5 | 8 | 7 |
| Total treatment time (hr) | 4 | 20.5 | 30 | 38 | 45 |
| Adsorbent weight (g) | 578.12 | 575.08 | 575.08 | 575.30 | 574.50 |
| Weight loss (%) | 18.57 | 19.00 | 19.00 | 18.97 | 19.08 |
| Dynamic N$_2$ capacity (cm$^3$) | 10769.5 | 11460.7 | 11500.6 | 12300.6 | 12006.6 |
| Washout time (sec.) | 21.6 | 23.0 | 23.1 | 24.8 | 24.2 |

EXAMPLE 11

Following the general procedure of Example 10, a full-size module was prepared using 581.3 grams of polysulfone-bound 13X extrudates synthesized with the general procedure described in Example 1. Results of hot gas activation are summarized in Table 5.

TABLE 5

| Sample | Immobilized module (Example 11) | | |
|---|---|---|---|
| Exit gas temp. (° C.) | 166 | 190 | 171 |
| Treatment duration (hr) | 5.5 | 14.25 | 10.00 |
| Total treatment time (hr) | 5.5 | 19.75 | 29.75 |
| Adsorbent weight (g) | 476.93 | 475.89 | 475.47 |
| Weight loss (%) | 17.95 | 18.13 | 18.20 |
| Dynamic N$_2$ capacity (cm$^3$) | 10399.0 | 10635.8 | 10802.2 |
| Washout time (sec.) | 21.3 | 22.0 | 22.3 |

As can be appreciated by those skilled in the art, the present invention provides an improved apparatus for and method of separating nitrogen from air. Also provided is an apparatus and method that has a high capacity and reliability for nitrogen adsorption. The present invention for a method of making a nitrogen adsorbent is simple and low in cost. The nitrogen adsorbent apparatus can be utilized in the form of a cartridge that allows easy use and replacement, while minimizing shifting of the adsorbent material within the cartridge due to vibration or other shocks. The cartridge also provides good mass transfer kinetics and withstands heating up to about 200° C.

It should be understood, of course, that the foregoing relates to preferred embodiments of the invention and that modifications may be made without departing from the spirit and scope of the invention as set forth in the following claims.

We claim:

1. A method of making a gas adsorbent, comprising:
   forming a polymer solution that comprises a first solvent and dissolved therein an organic polymer selected from the group consisting of polysulfone, polyamide, polyimide, epoxy, polyolefin, polyether, polysiloxane, polyvinyl and polyketone;
   mixing an inorganic adsorbent with said polymer solution to form a precursor;
   shaping said precursor; and
   leaching said precursor with a second solvent in which said organic polymer is insoluble.

2. The method of claim 1, wherein said polymer and said first solvent are present in said polymer solution in a ratio between about 1:5 and 1:10 by weight.

3. The method of claim 1, wherein said polymer solution is characterized by an absence of said polymer suspended in said first solvent.

4. The method of claim 1, wherein said first solvent is selected from the group consisting of N,N-dimethylformamide, dimethyl sulfoxide, acetone, 1,4-dioxane, methyl cellosolve, pyridine and mixtures thereof.

5. The method of claim 1, wherein said organic polymer is polysulfone.

6. The method of claim 1, wherein said polymer and inorganic adsorbent are present in said precursor in a ratio between about 40:60 and 5:95 by weight.

7. The method of claim 1, wherein said inorganic adsorbent is selected from the group consisting of zeolite, activated alumina, silica gel, carbon adsorbents and mixtures thereof.

8. The method of claim 1, wherein said inorganic adsorbent comprises activated zeolite 13X.

9. The method of claim 1, wherein said precursor is in the form of a dough or paste.

10. The method of claim 1, wherein said leaching generates porosity in said gas adsorbent of about 0.01 to about 20 microns and a maximum degree of porosity of said gas adsorbent of about 30 to 40%.

11. The method of claim 1, wherein said second solvent is selected from the group consisting of ethanol, methanol, water, and mixtures thereof.

12. The method of claim 1, further comprising heating said precursor to a temperature sufficient to substantially remove said second solvent.

13. The method of claim 12, wherein said precursor is heated until less than about 25% by weight of said precursor is volatile material.

14. The method of claim 12, wherein said precursor is heated using a hot inert gas.

15. The method of claim 1, wherein the step of shaping comprises molding said precursor into a shape selected from the group consisting of droplets, extrudates, discs, spiral wound modules, and hollow fibers.

16. The method of claim 1, wherein said precursor is shaped into droplets by dripping said precursor into a stirred vessel containing said second solvent.

17. The method of claim 1, wherein said precursor is shaped into extrudates by extruding said precursor through a circular die and into a vessel containing said second solvent.

18. The method of claim 1, further comprising packing said gas adsorbent into a housing.

19. The method of claim 18, wherein said gas adsorbent is packed to a density between 0.5 and 0.65 g/ml.

20. The method of claim 18, further comprising forming said gas adsorbent in said housing into a single mass.

21. A gas adsorbent made according to the method of claim 1.

22. A method of removing nitrogen from a mixture with oxygen comprising passing said mixture through a gas adsorbent according to claim 21 and selectively adsorbing nitrogen over oxygen from said mixture by said gas adsorbent.

23. A method of making a gas adsorbent, comprising:

forming a polymer solution that comprises a first solvent selected from the group consisting of N,N-dimethylformamide (DMF), dimethyl sulfoxide (DMSO), acetone, 1,4-dioxane, methyl cellosolve, pyridine and mixtures thereof and an organic polymer selected from the group consisting of polysulfone, polyamide, polyimide, epoxy, polyolefin, polyether, polysiloxane, polyvinyl and polyketone, where said organic polymer is dissolved in said first solvent at a ratio of said organic polymer to said first solvent of between about 1:5 and 1:10 by weight;

mixing with said polymer solution an inorganic adsorbent selected from the group consisting of zeolite, activated alumina, silica gel, carbon adsorbents and mixtures thereof, in a ratio of said organic polymer to said inorganic adsorbent between about 40:60 and 5:95 by weight, whereby a precursor is formed;

molding said precursor into a shape;

leaching said precursor with a second solvent in which said organic polymer is insoluble, selected from the group consisting of ethanol, methanol, water, and mixtures thereof; and drying said precursor.

24. A gas adsorbent made according to the method of claim 23.

25. A method of removing nitrogen from a mixture with oxygen comprising passing said mixture through a gas adsorbent according to claim 24 and selectively adsorbing nitrogen over oxygen from said mixture by said gas adsorbent.

26. A method of making a gas adsorbent, comprising:

forming a polymer solution that comprises polysulfone and N,N-dimethylformamide in a weight ratio between about 1:5 and 1:10;

mixing a zeolite with said polymer solution in a ratio of said polysulfone to said zeolite between about 40:60 and 5:95, whereby a precursor is formed;

molding said precursor into a shape;

leaching said precursor with a solvent selected from the group consisting of ethanol, methanol, water, and mixtures thereof; and drying said precursor.

27. The method of claim 26, wherein said zeolite comprises activated zeolite 13X.

28. A gas adsorbent made according to the method of claim 26.

29. A method of removing nitrogen from a mixture with oxygen comprising passing said mixture through a gas adsorbent according to claim 28 and selectively adsorbing nitrogen over oxygen from said mixture by said gas adsorbent.

* * * * *